Feb. 18, 1930.  H. E. McCRERY ET AL  1,747,784
APPARATUS FOR MANUFACTURING BIMETALLIC BILLETS
Filed June 23, 1926   5 Sheets-Sheet 2
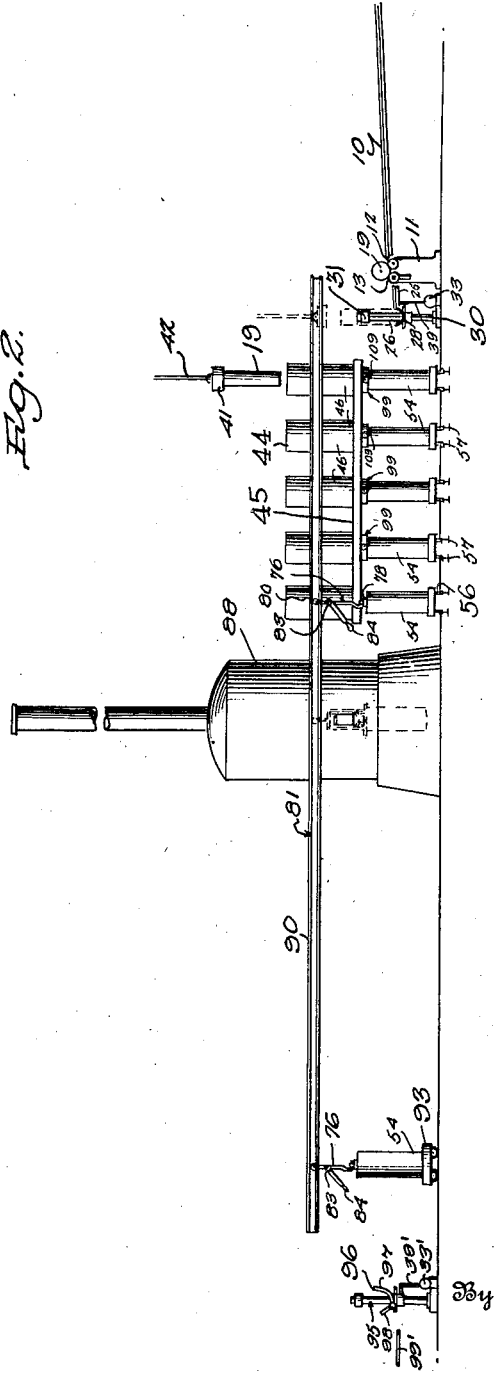
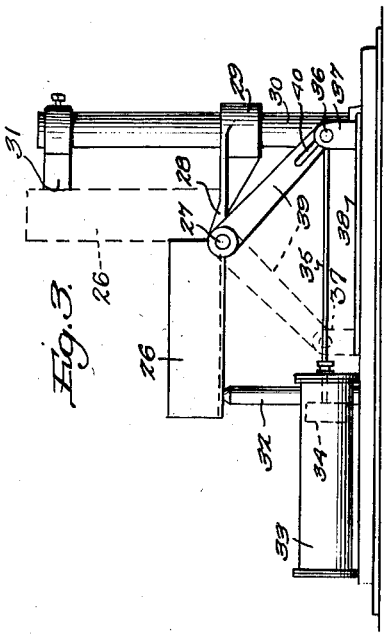
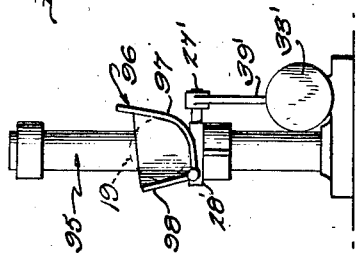
Inventor
H.E. McCRERY
A.E. JESSER
By Ch. Farben
Attorney Feb. 18, 1930.  H. E. McCRERY ET AL  1,747,784
APPARATUS FOR MANUFACTURING BIMETALLIC BILLETS
Filed June 23, 1926  5 Sheets-Sheet 3
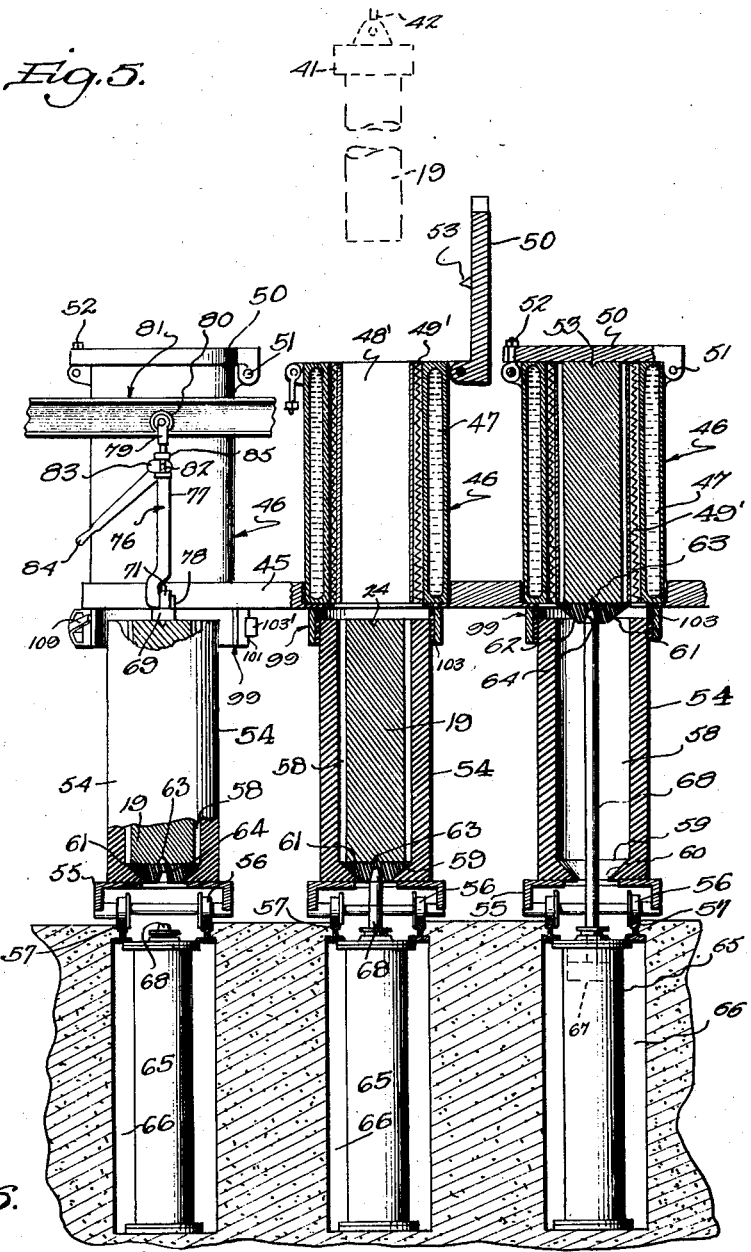
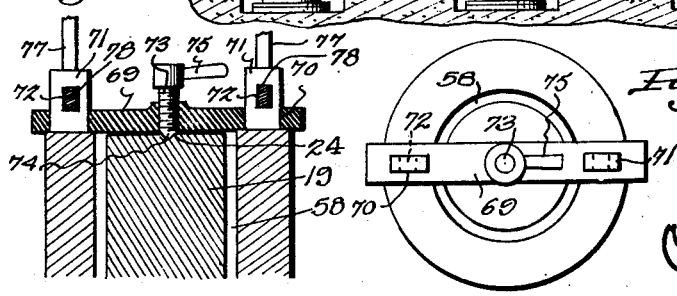
Inventor
H. E. McCRERY
A. E. JESSER Feb. 18, 1930.  H. E. McCRERY ET AL  1,747,784
APPARATUS FOR MANUFACTURING BIMETALLIC BILLETS
Filed June 23, 1926  5 Sheets-Sheet 4
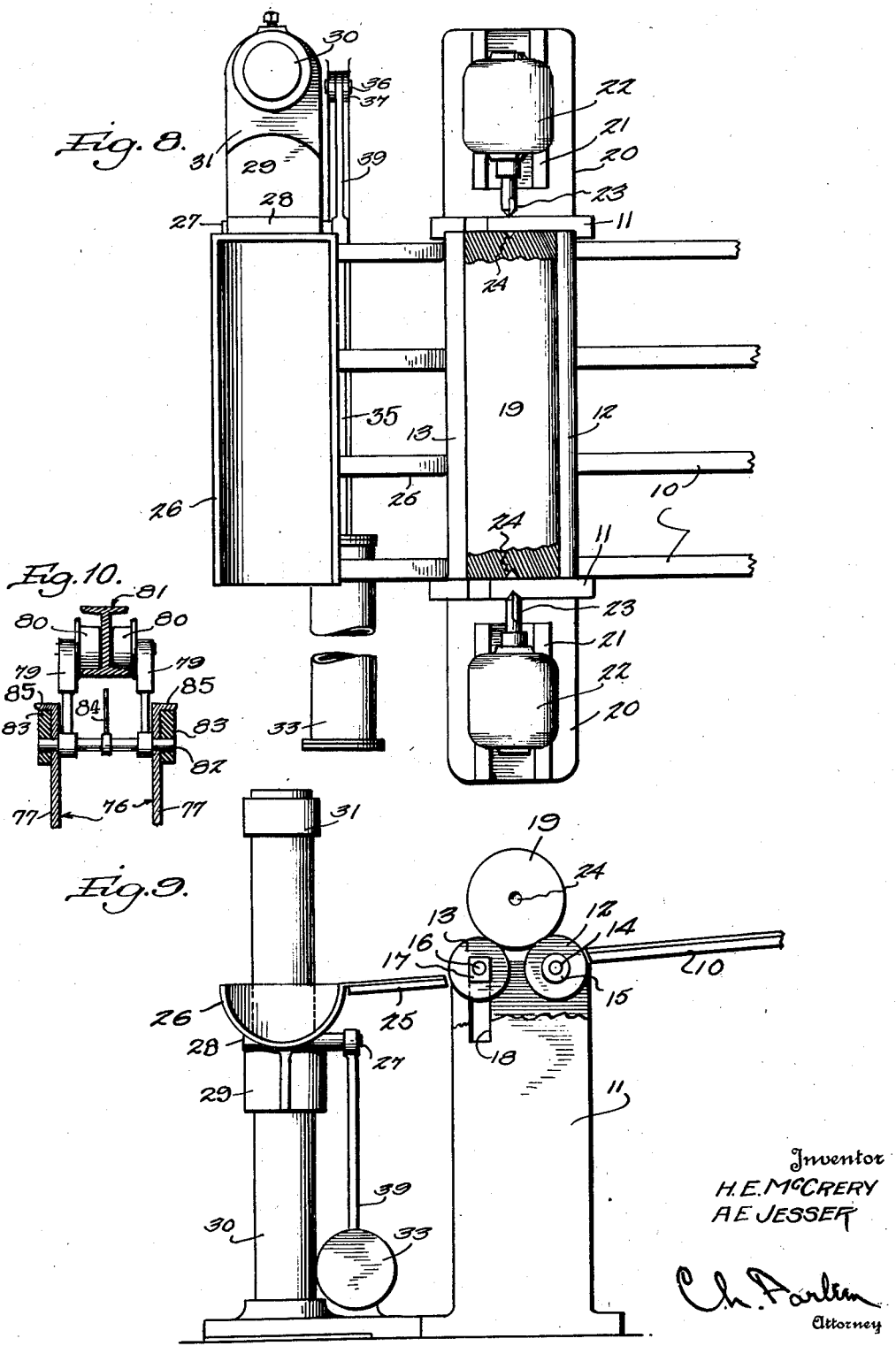

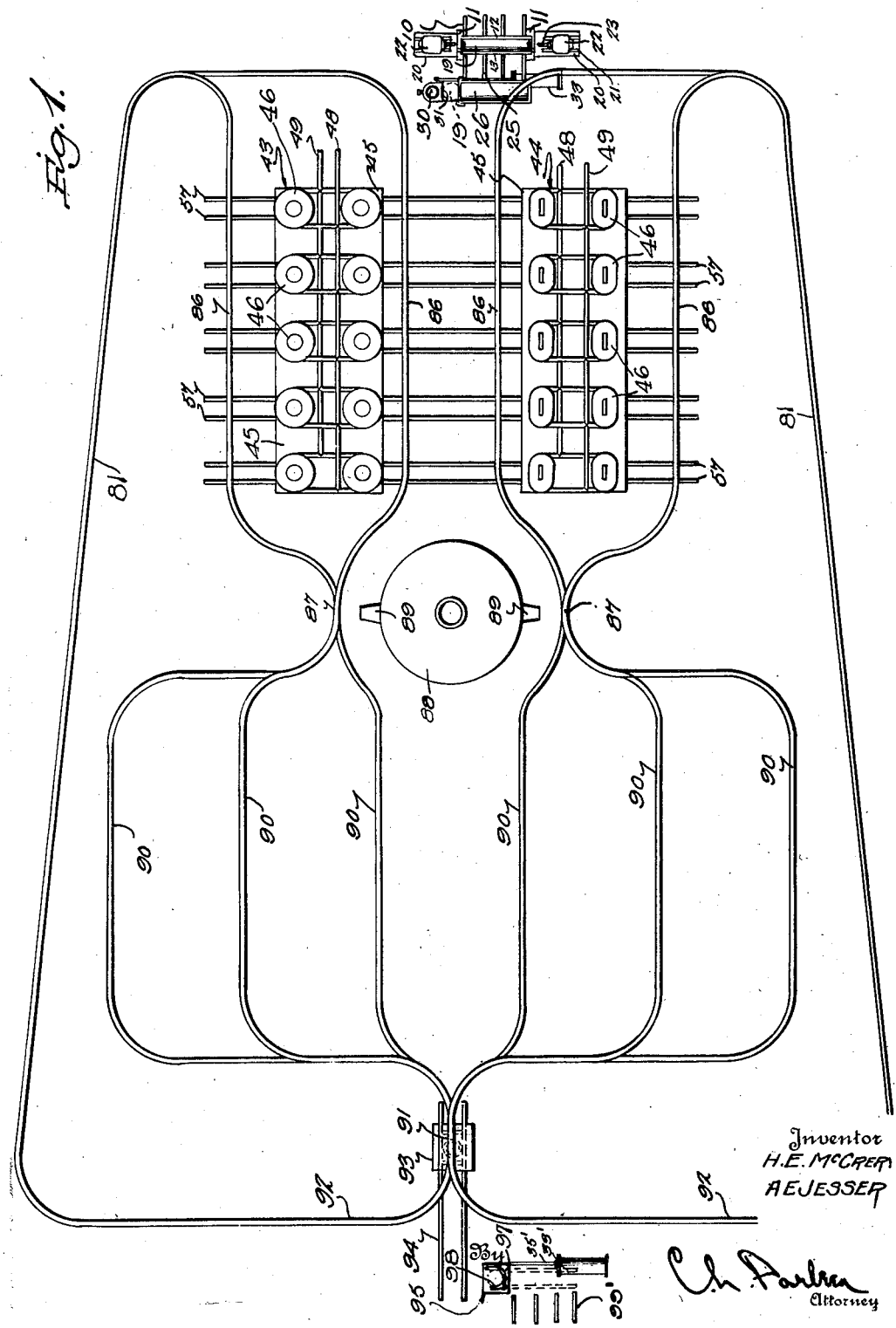

Feb. 18, 1930.    H. E. McCRERY ET AL    1,747,784
APPARATUS FOR MANUFACTURING BIMETALLIC BILLETS
Filed June 23, 1926    5 Sheets-Sheet 5

Inventor
H.E. McCRERY
A.E. JESSER
By
Attorney

Patented Feb. 18, 1930

1,747,784

UNITED STATES PATENT OFFICE

HAROLD E. McCRERY AND ALBERT E. JESSER, OF APOLLO, PENNSYLVANIA, ASSIGNORS TO COPPER WELD COMPANY, OF GLASSPORT, PENNSYLVANIA, A CORPORATION OF PENNSYLVANIA

APPARATUS FOR MANUFACTURING BIMETALLIC BILLETS

Application filed June 23, 1926. Serial No. 118,039. REISSUED

This invention relates to an apparatus for manufacturing bi-metallic billets, and more particularly to an apparatus for heating steel and similar ingots of varying cross-sectional shapes and for casting copper or similar jackets around such ingots. In a copending application for molding method and apparatus therefor, Serial No. 240,311, filed December 15, 1927, which application is a division of the present application, we have described and claimed a molding method and apparatus particularly adapted for use in connection with the invention disclosed and claimed in the present application.

In the metal industries it is the usual practice to form bi-metallic billets by casting a jacket of copper about a bar or ingot of steel or the like, but considerable difficulty has been experienced in causing an intimate cohesion of the copper to the base bar due to the formation of oxids on the surfaces of the bar before the copper casting operation can be completed. In carrying out the usual operation a base bar or ingot is placed in a mold, the inner walls of which are parallel to and spaced from the surfaces of the base bar, and the molten copper is poured around the base bar. It has been found difficult to properly retain the base bars centered within the molds, and accordingly the copper jacketing of the finished billets usually is of uneven thickness. According to the present practice therefore many of the billets must be discarded as imperfect.

It is an important object of the present invention to provide a method of making bi-metallic billets wherein an intimate cohesion of the copper or other jacketing metal with the base bar is provided, and wherein the thickness of the jacketing is substantially uniform throughout the length and circumference of the billet.

A further object is to provide novel means for heating the base bars adjacent the molds and subsequently to immediately introduce the base bar into the mold, and pour the molten metal therein.

A further object is to provide a method of the character outlined wherein the base bar is heated to a relatively high temperature substantially out of contact with the atmosphere to minimize the formation of oxids on the surfaces of the base bar and to immediately introduce the base bar into the mold and pour the molten metal therein, the transferring of the base bar from the heating means to the mold being accomplished without bringing the base bar into substantial contact with the atmosphere.

A further object of the invention is to provide a novel form of apparatus including a closed heating unit having means for supporting a bar therein and movable molds adapted to be brought into vertical alinement with the heating means therebelow to directly receive the bars after they have been properly heated.

A further object is to provide an apparatus of the character just outlined wherein the mold is provided with a movable bottom section adapted to be moved upwardly to support the base bar in the heater and to form a closure for the latter during the heating operation, means being provided for lowering the bar into the mold after the heating operation is acomplished.

A further object is to provide novel means for excluding air from the bar as it is transferred from a heating unit to a mold to minimize the formation of oxids on the surface of the bar.

A further object is to provide a novel form of air excluding means comprising a member adapted to be arranged between a heating unit and a mold and adapted to be clamped in position about the upper end of the latter to exclude air from and to retain the heat in a bar as it is transferred from the heating unit to the mold, the air excluding means being adapted to open to permit the molds to be removed.

A further object is to provide a heat excluding device of the character referred to which is adapted to be carried by the lower end of a heating unit and to be clamped around the upper end of one of the molds to exclude air from the latter, the means for transferring the bar from the heating unit to the mold being adapted to create a partial vacuum to reduce the amount of air in contact with the bar after it is placed in position in the mold and before the mold is moved.

A further object is to provide novel means for centering the base bar in the heating unit to provide even heating of the bar, and to properly center the bar in the mold whereby a jacketing of uniform thickness may be cast around the bar.

A further object is to provide a novel form of mold having movable upper and lower ends provided with inwardly projecting centering means adapted to enter center openings formed in the bars.

A further object is to provide novel means for forming center openings in the bars.

A further object is to provide a pair of drills adapted to be moved into contact with the bar to provide the center openings referred to while the bar is in a horizontal position, and to provide means for swinging the bar to a vertical position to adapt it for insertion in the mold.

A further object is to provide novel means for removing the molds from points adjacent the heating units to the casting furnace to receive the molten metal and to provide means for discharging the finished billets from the molds and returning the latter to their operative positions beneath the heating units.

Other objects and advantages of the invention will become apparent during the course of the following description.

In the drawings we have shown one embodiment of the invention. In this showing:

Figure 1 is a plan view of the apparatus,

Figure 2 is a side elevation of the same,

Figure 3 is a side elevation of the ingot elevating device,

Figure 11:
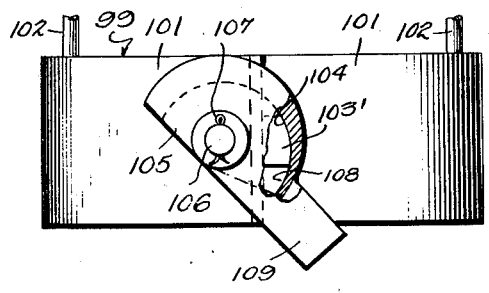
Figure 13:
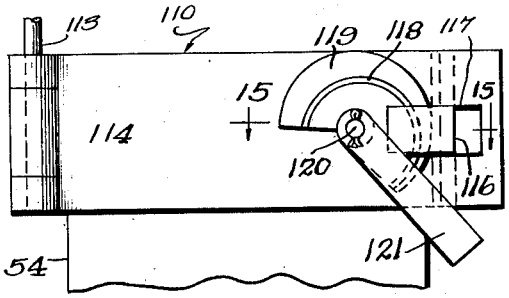
Figure 12:
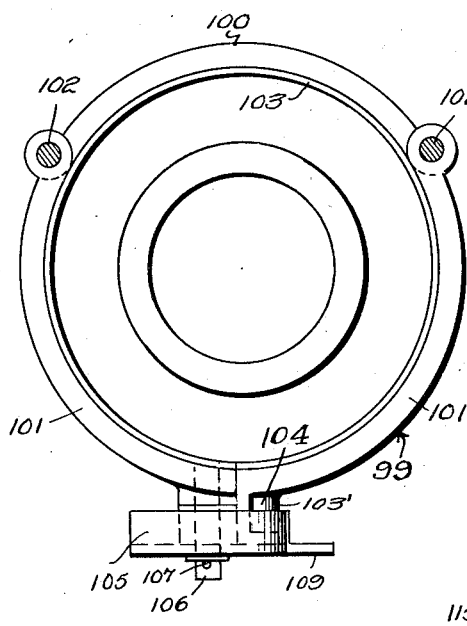
Figure 14:
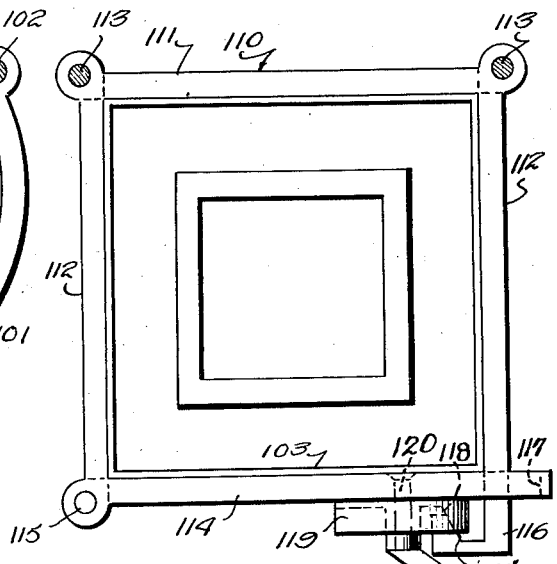
Figure 15:
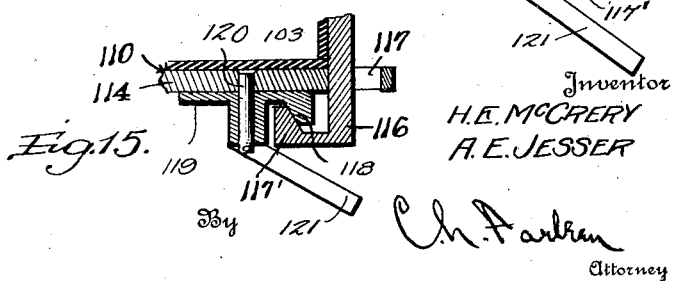

Figure 4 is an end elevation of a somewhat similar device employed when discharging the billets from the molds, Figure 5 is a central vertical sectional view through a plurality of molds, heating units and associated elements, parts being shown in elevation, Figure 6 is a detail sectional view through the upper end of one of the molds, Figure 7 is a plan view of one of the molds, Figure 8 is an enlarged plan view of the center hole forming means and associated elements, parts being shown in section, Figure 9 is a side elevation of the same, parts being omitted, Figure 10 is a detail view of the mold lifting device, Figure 11 is a front elevation of one form of heat retaining means, parts being broken away, Figure 12 is a plan view of the same, Figure 13 is a front elevation of a modified form of heat retaining device, Figure 14 is a plan view of the same, and Figure 15 is a detail sectional view on the line 15—15 of Figure 13.

Referring to Figures 1 and 2 the numeral 10 designates a gravity or other conveyor adapted to convey the base bars or ingots to the center hole forming means. As shown, a pair of standards 11 is arranged near the discharge end of the conveyor and are adapted to support rolls 12 and 13. The roll 12 is provided at opposite ends with stub shafts 14 rotatable in fixed bearings 15 carried by the standards 11, while the roll 13 is similarly provided with stub shafts 16 mounted in bearings 17 which are vertically movable in slots 18. Any suitable means may be employed for effecting the vertical movement of the roll 13 for a purpose to be described. The rolls 12 and 13 form supporting means for each successive base bar or ingot 19, as shown in Figure 9.

Each standard 11 is preferably provided with a horizontal support 20 projecting outwardly therefrom and provided with guides 21. A motor 22 is mounted to reciprocate in the guides of each support 20 and each motor is adapted to drive a countersink 23 or similar drilling device adapted to be moved into contact with the ends of the ingots to provide center holes therein. The rolls 12 and 13 are preferably placed in such a position that when an ingot of given size is arranged thereon, the axis of the ingot will coincide with the axes of the motors 22.

It will be obvious that lowering of the roll 13 will discharge each successive ingot from the rolls 12 and 13, and a suitable conveyor 25 is provided for supporting the discharged ingots and conveying them to a receiver 26. This receiver is substantially semi-circular in cross section, as clearly shown in Figure 9. The receiver 26 is secured at one end to a shaft 27 journaled in a bearing 28 carried by a supporting bracket 29. The bracket 29 is secured to a post or standard 30 which is provided with a stop 31 at its upper end for a purpose to be described. The free end of the receiver 26 is normally supported upon a stationary post 32. Means is provided for raising the ingots to a vertical position by swinging the receiver 26, for a purpose to be described. As shown, a cylinder 33 is provided with a piston 34 secured to a piston rod 35, and reciprocation of the piston is accomplished by the introduction of compressed air on opposite sides of the piston by suitable pipes (not shown). The opposite end of the piston rod 35 is secured to a pin 36 carried by a cross head 37 mounted to reciprocate in guides 38. An arm 39 is secured to the shaft 27, and this arm is provided in its opposite end with a slot 40 through which the pin 36 projects. It will be apparent that introduction of pressure into the right end of the cylinder 33, as viewed in Figure 3, will draw the piston 34 toward the left, thus swinging the arm 39 to the dotted line position and elevating the receiver 26 to a vertical position, the ingot in the receiver contacting with the stop 31 to limit its movement.

After the ingot has been elevated to a vertical position, means is provided for lifting the ingot and inserting it into one of the heating units to be described. For elevating the ingots, we provide an electro-magnet 41 suspended from a cable 42. This cable may be connected at its upper end to a suitable carriage movable along an ordinary overhead trackway (not shown). While we have described the use of an electro-magnet, we prefer to use such a lifting device merely as a matter of convenience and may employ any suitable lifting means as will be apparent.

Referring to Figure 1, the numerals 43 and 44 designate a pair of batteries of heating units suitably supported in frames 45 a substantial distance above the floor, as shown in Figure 5. These batteries may be duplicates of each other, or may be formed in any desired shape according to the cross sectional shapes of the ingots. In Figure 1, we have illustrated the heating units 43 as adapted to receive circular ingots, while the battery 44 is adapted to receive ingots which are oblong in cross sectional shape. Aside from the difference in cross sectional shapes, the batteries 43 and 44 are identical, and only one battery need be described in detail.

Referring to Figures 1 and 5, each battery 43 and 44 consists of a plurality of heating units each of which is designated as a whole by the numeral 46. Each heating unit comprises a metallic casing the outer portion of which is surrounded by a water jacket 47, water being supplied to the jackets through a manifold 48 and drawn off from the jackets through a manifold 49. Each unit is provided with a central opening 48', and the unit is adapted to be heated by coils 49' of any suitable type. Each unit is provided with a cover 50 hinged at one side to the unit as at 51, the opposite side of each cover being adapted to be secured in closed position by a clamping bolt 52. Each cover 50 is provided on its lower face with a conical central projection 53 arranged co-axial with the opening 48' when the cover is closed.

As illustrated in Figure 1, each battery 43 and 44 consists of two lines of heating units for convenience in operating the apparatus, as will become apparent. Molds designated as a whole by the numeral 54 are adapted to be brought into position beneath the heating units 46, one mold preferably being provided for each of the heating units. The molds are preferably mounted upon what are known in the art as "buggies" indicated in the drawings by the numeral 55. One buggy is provided for each of the molds and is mounted upon wheels 56 traveling upon rails 57. The rails extend transversely of the apparatus, as shown in Figure 1, each buggy when removed from beneath its corresponding heating unit, being moved outwardly with respect to each battery of heating units, along the rails 57.

Each mold is provided with an axial receiving opening 58 corresponding generally in shape and size to the openings 48' of the heating units. At its lower end, each mold is provided with a conical depression 59 having an open lower end 60. A plunger or supporting member 61 is arranged in each of the molds, and each of these plungers is provided with a conical face 62 adapted to seat against the surface 59. The plungers 61 substantially snugly fit within the molds, and obviously will be centered therein. Each of the plungers is provided on its upper face with a conical elevation 63 arranged co-axially with the mold, and the lower face of each plunger is provided with a recess 64 for a purpose to be described. Each of the molds is preferably of the split type comprising a pair of complementary sections which may be separated to permit the finished billets to be removed therefrom. The split feature of the mold is in itself old and well known and no detailed description thereof is believed to be necessary.

Each mold is adapted to be brought into axial alinement with its corresponding heating element as previously described, and means are provided for elevating the plungers to form closures for the lower ends of the heating elements and supports for the ingots therein. As shown in Figure 5, a cylinder 65 is arranged in a recess 66, beneath and in axial alinement with each of the heating units. Each cylinder is provided with a plunger or piston 67 secured to the lower end of a piston rod 68, the upper end of which is adapted to be received in one of the recesses 64. Means (not shown) is provided for introducing compressed air or other fluid into the lower ends of the cylinders 65 to elevate the pistons 67 as will be apparent. When pressure is released from the lower ends of the cylinders, the piston rods 68 will assume the position shown in the left hand side of Figure 5 of the drawings. Thus it will be apparent that when the pistons 67 are withdrawn the buggies 55 are freely movable along the rails. From the drawings it will be apparent that each mold, when in operative position, is arranged beneath and adjacent its corresponding heating device whereby a bar lowered from a heating device into the mold will not come into substantial contact with the atmosphere, thus minimizing the formation of oxides on the surface of the bar. However, we prefer to provide means for excluding air from the bar during the transferring operation, this means being described later.

It will be apparent that when one of the pistons 67 is lowered to normal position, the plunger 61 associated therewith is adapted to support the ingot within the corresponding mold, and means is provided for closing the upper end of the mold as shown in detail in Figures 6 and 7. As shown, a cover 69 is provided with openings 70 through which project ears 71 carried by the upper end of each mold. These ears are provided with openings 72 for a purpose to be described. A screw 73 projects through each cover 69 and is provided at its lower end with a conical extremity 74 adapted to engage within one of the center holes of the ingot as shown. An operating handle 75 is adapted to rotate the screw 73 as will be apparent.

After one of the molds is closed, as shown in Figure 6, it is moved from beneath its corresponding heating unit by rolling the buggy 55 along the rails 57. The mold is then adapted to be picked up by an elevating device 76 which comprises a pair of depending arms 77 having hooks 78 at their lower ends. These hooks are arranged substantially horizontally and are received in the openings 72 whereby the mold may be lifted and the cover 69 maintained in closed position. A suspension member 79 (see Figure 5) is connected to wheels 80 which are adapted to run upon rails designated as a whole by the numeral 81. The suspension member is provided with a transverse pin 82 which supports cams 83 adapted to be operated by a lever 84. The cams are adapted to contact with lateral projections 85 carried by the arms 77 whereby the latter may be elevated to lift the mold from its buggy when the lever 84 is swung in one direction.

The track 81 is provided with sections 86 arranged on opposite sides of each battery 43 and 44. These track sections are adapted to permit the elevating devices to be brought in proximity to any set of rails 57 as will be apparent. The rail sections 86 are brought to converging points 87 upon opposite sides of a furnace 88 which normally maintains a body of metal in a molten condition, the metal being adapted to be discharged from the furnace through spouts 89. From each converging point 87 the rails lead to additional sections 90 which serve as cooling racks for a purpose to be described. From the cooling racks the rails again converge to the point 91, and outwardly of the point 91 rail sections 92 are provided for returning the molds to their normal positions on the buggies supported on the rails 57.

Beneath the rail point 91 an additional auxiliary buggy 93 is arranged, and this buggy is adapted to roll upon rails 94. The lowering device indicated as a whole by the numeral 95 is arranged adjacent the outer end of the rails 94. The lowering device is similar to the device previously described for elevating the ingots to a vertical position after the center holes have been drilled therein, and accordingly the lowering device need not be described in detail. Certain parts of the lowering device similar to corresponding parts of the elevating device are designated by corresponding reference numerals each having a prime affixed. In place of the receiver 26, the lowering device 95 is provided with a receiver 96 having a fixed section 97 and a hinged section 98 which may be retained in the operative position shown in Figure 4 by any suitable means. The receiver 96 is adapted to be lowered from the vertical position shown in Figure 1 to the horizontal position shown in Figure 4 whereupon the movable section 98 may be lowered to discharge the billets upon a take-off conveyor 99'.

In Figures 11 to 15 inclusive, we have shown means for excluding air from the bar when it is transferred from a heating unit to one of the molds. As shown, the numeral 99 designates an air excluding device adapted for use in connection with one of the circular molds. The device 99 comprises a rear section 100 and a pair of front sections 101. Pivot pins 102 connect the rear section 100 with the forward sections 101, and the pins 102 extend upwardly as shown in Figure 11 for connection with the lower end of one of the heating units. The device 99 is circular as previously stated and one of the devices is arranged in axial alinement with each of the heating units. It will be apparent that one of the devices 99 is permanently secured against the lower end of each heating unit by the pivot pins 102. The device 99 is lined with a heat resisting material 103, and in practice we prefer to provide a lining formed of asbestos or the like. It will be obvious that the device 99 must be opened to permit a mold to be withdrawn therefrom, and accordingly the forward sections 101 are adapted to swing outwardly to permit the mold to be removed, the outward swinging of the sections 101 being permitted by the pivot connections between the sections 100 and 101. In Figure 5 of the drawings we have shown two of the heat retaining devices 99 arranged in operative position, another of these devices being shown open at the left side of Figure 5, to permit the mold to be withdrawn. It will be obvious that when one of the devices is closed, it is clamped firmly about its corresponding mold to exclude air therefrom. Means are provided for clamping the free ends of the forward sections 101 together. As shown, one of the sections 101 is provided with a lug 103' having an arcuate outer face 104. A locking member 105 is pivotally connected to the free end of the other section 101 by a pin 106, the lock being retained in position by a cotter pin or other fastening device 107. The locking device is provided with an inner arcuate recess 108 having a wall arranged eccentric to the pin 106 to engage the arcuate face 104 of the lug 103'. The locking device is provided with an operating handle 109 to permit it to be revolved.

In Figures 13 to 15 inclusive, we have shown a heat retaining device 110 adapted for use in connection with square molds, but it will be apparent that the device easily can be altered to accommodate any desired form of mold. The device 110 includes a stationary section 111 at the rear thereof and movable side sections 112. The adjacent ends of the sections 111 and 112 are pivotally connected by pins or rods 113, the upper ends of which project upwardly as shown in Figure 13, for connection with one of the heating devices whereby the device 110 may be rigidly secured thereto.

A movable front section 114 is hinged to the forward end of one of the sections 112 by a pivot pin 115. The forward end of the other section 112 is provided with an extension 116 which projects through an opening 117 formed in the free end of the section 114. The projecting end 116 is provided with a lug 117' which is adapted to be engaged by an eccentric cam face 118 carried by a locking member 119. The locking member is pivoted to the free end of the section 114 by a pin 120 and is provided with an operating handle 121.

The operation of the apparatus is as follows:

The ingots are preferably provided with etched surfaces whereby the copper coating to be applied may more firmly engage the surface of the ingot. The etching operation may be performed in any desired manner and forms no part of the present invention. The etched ingots are fed to the rolls 12 and 13 one at a time, and while one of the ingots is in the position shown in Figure 9, the motors 22 are moved inwardly to drill the center holes 24. The roll 13 is then lowered and the ingot is discharged upon the conveyor 25 which conveys it to the receiver 26. Air is then admitted into the cylinder 33 to elevate the receiver in the manner previously described, whereupon the electro-magnet 41 is lowered to pick up the ingot.

Air is admitted into one of the cylinders 65 to elevate the piston 67 therein to the position shown at the right side of Figure 5, the plunger 61 in the mold being elevated by the piston rod 68 as the latter is elevated. It will be apparent that the piston rod is freely movable through the lower end of the mold to elevate the plunger, and the latter when elevated contacts with and forms a closure for the lower end of the heating unit. With the cover 50 of the heating unit open, the electro-magnet is moved over the heating unit and lowered whereby the ingot is inserted into the mold and supported upon the plunger 61. The cover 50 is then closed and bolted, and it will be apparent that the conical projections 53 and 63 of the cover 50 and plunger 61 properly center the ingot within the heating unit. Heat is supplied by the heating coils until the temperature of the ingot is raised to the proper point. This operation usually requires about fifteen or twenty minutes, and upon completion of the heating operation, the air is exhausted from the lower end of the cylinder 65, thus permitting the plunger 61 and the ingot to move downwardly by gravity into the mold opening 58. It will be obvious that the heating operation is carried on with the ingot substantially out of contact with the atmosphere whereby oxidation is materially reduced, and upon completion of the heating operation the ingot is immediately introduced into the mold. As previously stated, the plunger 61 fits snugly within the mold 58, but is slidable therein. The ingot is supported on the plunger 61, and it will be obvious that when the piston rod 68 moves downwardly, the plunger and the ingot will be lowered into the mold. Downward movement of the plunger 61 forces air from the mold through the opening in the lower end of the mold as will be obvious. With the cover 50 closed, and one of the air excluding devices 99 in position, it will be apparent that the plunger 61 acts to exhaust air from the mold thus reducing the pressure of air in the mold and rarefying the air thus substantially eliminating oxidation of the ingot. The air excluding devices also retain the heat in the ingot until such time as the mold is removed to permit the copper or other metal to be poured around the ingot. The heat from the ingot expands what little air remains in the mold so that very little additional air will flow therein after the heat retaining device is removed. The member 99 readily may be removed by revolving the handle 109 to release the cam 108 from the lug 103', whereupon the movable sections 101 may be swung outwardly as indicated at the left side of Figure 5. It will be obvious that the heat retaining device 110 may be operated in a similar manner, the movable sections 112 and 114 being swung outwardly by releasing the locking device 119. After the plunger 61 is moved to its lowermost position, and the heat retaining device is open, the buggy upon which the mold rests may be withdrawn from beneath the heating unit and the cover 69 applied in the manner previously described. The handle 75 is turned to cause the conical end of the screw 73 to enter the center hole 24 at the upper end of the ingot, whereby it will be apparent that the latter is firmly centered in the mold and maintained in its central position throughout the remainder of the operation. The handle 84 is elevated to lift the mold far enough to clear the buggy whereupon the mold may be removed along the rail section 86 to one of the converging points 87. As shown in Figure 7, the cover 69 is relatively narrow, leaving the space between the ingot and the mold walls open, whereupon the molten copper or other metal may be poured into this space from one of the spouts 89. After the mold is filled, it may be removed to one of the cooling rack rail sections 90 where it is permitted to remain until the temperature of the copper jacket is lowered sufficiently to permit it to solidify. The mold is then moved to the rail point 91 whereupon the handle 84 is lowered thereby depositing the mold upon the buggy 93. The buggy 93 is then moved outwardly along the rails 94 to a point opposite the receiver 96, and with the latter in vertical position, the billet is moved thereinto either manually or otherwise, after which the receiver is lowered to a horizontal position and the completed billet is discharged upon the conveyor 99'.

It will be obvious that all of the heating units and molds may be successively and continuously operated to prepare the ingots for the casting operation, a plurality of the heating units and molds being provided in order that the operations may be substantially continuously carried out.

From the foregoing, it will be apparent that we provide a method of forming bimetallic billets wherein a base bar or ingot is heated substantially out of contact with the atmosphere after which it is immediately introduced into a mold and the molten metal poured into the mold to form the finished billet.

In the use of the apparatus it has been found that the formation of oxids on the ingots while within the heating units is substantially entirely eliminated, thus permitting an intimate cohesion of the copper jacket to the base bar. Changes in temperature of the molds cause them to warp slightly, and this warping ordinarily affects the thickness of the copper jacketing owing to the shifting of the positions of the ingots. With the present invention, however, the cooperation between the center projections 53 and 63 with the center openings of the ingots causes the latter to be held in fixed axial alinement with the mold and accordingly a jacketing of substantially uniform thickness is provided.

It is to be understood that the form of our invention herewith shown and described is to be taken as a preferred example of the same and that various changes in the shape, size, and arrangement of parts may be resorted to without departing from the spirit of the invention or the scope of the subjoined claims.

We claim:

1. Apparatus of the character described comprising a heating unit having an opening therein adapted to receive an ingot, and closure members for the opening in said unit, each of said closure members having portions adapted to engage the ingot to retain it centrally within and spaced from the walls of the opening in said unit.

2. Apparatus of the character described comprising a heating unit having an opening extending entirely therethrough to receive an ingot, and closure members for opposite ends of said opening, each of said closure members having portions adapted to engage the ingot to retain it in position in the heating unit.

3. Apparatus of the character described comprising a heating unit having a central opening extending therethrough to receive an ingot, means for heating said unit, and closure members for the opening in said heating unit, each of said closure members being provided on its inner face with a projection adapted to engage within preformed openings in the ingot whereby the latter will be supported centrally within and spaced from the walls of the opening in said heating unit.

4. Apparatus of the character described comprising a heating unit having a vertical opening extending therethrough to receive an ingot, a closure member for the upper end of said opening, means for securing said closure member in position against the upper end of said heating unit, a vertically movable closure member for the lower end of said heating unit, and means for vertically moving said last named closure member.

5. Apparatus of the character described comprising a heating unit having a vertical opening extending therethrough to receive an ingot, a closure member for the upper end of said opening, means for securing said closure member in position, a vertically movable closure member for the lower end of said heating unit, and means for vertically moving said last named closure member, each of said closure members having portions adapted to engage portions of the ingot whereby the latter will be supported centrally within and spaced from the walls of the opening in said heating unit when said closure members are in operative position.

6. Apparatus of the character described comprising a vertical heating unit having an axial opening extending therethrough to receive an ingot, a movable mold adapted to be arranged beneath said heating unit in axial alinement therewith, and provided with an axial mold opening, a common closure member for the lower ends of said heating unit and said mold, said closure member being movable upwardly through the opening in said mold to contact with the lower end of said heating unit and being movable downwardly to contact with a portion of said mold adjacent the bottom thereof, and means for vertically moving said closure member.

7. Apparatus constructed in accordance with claim 6 provided with a closure member for the upper end of said heating unit, each of said closure members being provided on its inner face with a projection adapted to be received in a preformed opening in the ingot whereby the latter will be centered within and spaced from the walls of the opening in said heating unit.

8. Apparatus constructed in accordance with claim 6 wherein the means for vertically moving said closure member includes a vertically movable rod adapted to be disposed wholly beneath said mold and having its upper end movable through the opening therein, said closure member being provided in its lower face with a recess adapted to receive the upper end of said rod.

9. Apparatus of the character described comprising a heating unit having a vertical opening extending therethrough to receive an ingot, a movable mold having a vertical opening extending into the upper end thereof, said mold being adapted for arrangement beneath said heating unit with the openings in said heating unit and said mold in vertical alinement with each other, and means for transferring the ingot from said heating unit to said mold.

10. Apparatus constructed in accordance with claim 9 wherein the means for transferring the ingot from said heating unit to said mold includes a closure member for the lower end of said heating unit and vertically movable means adapted to support said closure member against the lower end of said heating unit, said vertically movable member being adapted to be moved downwardly to permit said closure member and the ingot to enter the opening in said mold.

11. Apparatus of the character described comprising a heating unit having a vertical opening extending therethrough to receive an ingot, a closure member for the upper end of said heating unit, a mold disposed wholly beneath said heating unit and provided with a vertical opening extending therethrough and having a retsricted lower end to form a supporting shoulder, means for supporting said mold for movement toward and away from a position with the opening therein in vertical alinement with the opening in said heating unit, a closure member for the lower end of said mold, said closure member being adapted to rest upon said shoulder, said closure member being movable upwardly through the opening in said mold to contact with the lower end of said heating unit whereby it is adapted to form a closure for said heating unit and to support the ingot therein, and vertically movable means adapted to contact with said closure member to support it in position against the lower end of said heating unit, said vertically movable means being adapted to be lowered to permit said lower closure member to rest upon said shoulder.

12. Apparatus constructed in accordance with claim 11 wherein the means for supporting said mold for movement comprises a buggy, wheels carried by said buggy, and rails upon which said wheels are adapted to travel.

13. Apparatus constructed in accordance with claim 11 wherein said vertically movable means comprises a rod movable vertically through said mold, a cylinder arranged wholly beneath said mold, and a piston secured to said rod and reciprocable in said cylinder.

14. Apparatus of the character described comprising a vertical heating unit having an axial opening extending therethrough to receive an ingot, a mold arranged beneath said heating unit in axial alinement therewith and provided with an axial opening adapted to receive the ingot transferred thereto from said heating unit, and means arranged between said heating unit and said mold for excluding air therefrom.

15. Apparatus of the character described comprising a vertical heating unit having an axial opening extending therethrough to receive an ingot, a mold normally arranged beneath said heating unit in vertical alinement therewith and laterally movable from normal positions, said mold being provided with an axial opening adapted to receive the ingot transferred thereto from said heating unit, and means arranged between said heating unit and said mold for excluding air from and retaining heat in said heating unit and said mold.

16. Apparatus of the character described comprising a heating unit adapted to receive an ingot, a mold arranged adjacent said heating unit and provided with an opening adapted to receive the ingot transferred thereto from said heating unit, and an air excluding and heat retaining member arranged between said heating unit and said mold.

17. Apparatus of the character described comprising a heating unit having an axial opening extending therethrough to receive an ingot, a mold arranged in axial alinement with said heating unit and provided with an opening to receive the ingot transferred thereto from said mold, said mold being movable from its position in axial alinement with said heating unit, an air excluding and heat retaining member arranged between said mold and said heating unit, said member being provided with a pair of movable sections and having a portion snugly surrounding a portion of said mold, and means for locking said movable sections together, said movable section being adapted to be moved outwardly from each other to permit movement of said mold.

18. Apparatus of the character described comprising a heating unit having an ingot receiving opening in the bottom thereof, a member normally closing the lower end of said opening to support an ingot therein, and means for supporting said member for downward movement to withdraw the ingot from the heating unit.

19. Apparatus of the character described comprising a heating unit having a vertical ingot receiving opening in the bottom thereof, a block adapted to be arranged against the bottom of said heating unit to form a complete closure for the lower end of said opening and to form the sole means for supporting an ingot in said opening, and means for supporting said block for vertical movement.

20. Apparatus of the character described comprising a heating unit having an ingot receiving opening therein, and means constituting closures for said opening adapted to engage solely within the end faces of the ingot to position it within the heating unit.

21. Apparatus of the character described comprising a heating unit having an ingot receiving opening therein and means constituting closures for said openings adapted to engage solely within the end faces of the ingot to positively support it centrally within the heating unit.

In testimony whereof we affix our signatures.

HAROLD E. McCRERY.
ALBERT E. JESSER.